(12) United States Patent
Grove, III et al.

(10) Patent No.: US 8,057,583 B2
(45) Date of Patent: Nov. 15, 2011

(54) FILTER MEDIA INCLUDING SILICONE AND/OR WAX ADDITIVE(S)

(75) Inventors: Dale Addison Grove, III, Holland, OH (US); Alan Michael Jaffee, Bowling Green, OH (US); Richard Thomas Giovannoni, Toledo, OH (US)

(73) Assignee: Johns Manville, Denver, CO (US)

( * ) Notice: Subject to any disclaimer, the term of this patent is extended or adjusted under 35 U.S.C. 154(b) by 129 days.

(21) Appl. No.: 12/221,905

(22) Filed: Aug. 7, 2008

(65) Prior Publication Data

US 2010/0031619 A1    Feb. 11, 2010

(51) Int. Cl.
*B01D 46/00* (2006.01)
(52) U.S. Cl. .................. 95/285; 55/524; 55/527; 55/528
(58) Field of Classification Search ............... 55/DIG. 5, 55/486, 525, 527, 528, 524; 95/285
See application file for complete search history.

(56) References Cited

U.S. PATENT DOCUMENTS

| | | | | |
|---|---|---|---|---|
| 3,317,367 | A | * | 5/1967 | Koller ............................. 428/92 |
| 5,785,725 | A | * | 7/1998 | Cusick et al. .................. 55/382 |
| 5,800,586 | A | | 9/1998 | Cusick et al. |
| 5,948,344 | A | | 9/1999 | Cusick et al. |
| 5,993,501 | A | | 11/1999 | Cusick et al. |
| 6,110,251 | A | | 8/2000 | Jackson et al. |
| 6,261,335 | B1 | | 7/2001 | Kern et al. |
| 2005/0160711 | A1 | * | 7/2005 | Yang .............................. 55/524 |
| 2006/0277877 | A1 | * | 12/2006 | Shields .......................... 55/486 |
| 2007/0271889 | A1 | | 11/2007 | Jaffee |
| 2007/0271890 | A1 | * | 11/2007 | Jaffee ............................. 55/527 |

* cited by examiner

*Primary Examiner* — Duane Smith
(74) *Attorney, Agent, or Firm* — Robert D. Touslee

(57) ABSTRACT

A method of improving filtration efficiency of a fibrous nonwoven filter media comprises providing a filter media and incorporating in the filter media one or more additives selected from the group consisting of silicone additives, wax additives, and mixtures thereof. The filter media comprises glass fibers, polymer fibers, and optionally binder. Inclusion of silicone and/or wax additive(s) in a filter media has surprisingly been found to increase filtration efficiency, for example, by 10-15%.

20 Claims, No Drawings

FILTER MEDIA INCLUDING SILICONE AND/OR WAX ADDITIVE(S)

FIELD

The present disclosure relates to methods of making fibrous, nonwoven filter media and the filter media so made.

BACKGROUND

The ASHRAE (American Society of Heating, Refrigerating and Air-Conditioning Engineers, Inc.) 52.2 standard rates filters on a MERV (which stands for Minimum Efficiency Reporting Valve) scale which standardizes and simplifies filter efficiency ratings for the public, and provides the initial, as received performance of a filter, allowing a contractor or building owner to select filters based on an efficiency scale. The present ASHRAE 52.2 test does, however, suffer from a number of testing flaws including the deterioration of electret filter performance with time, which is why a new optional testing procedure known as MERVa has been added to the procedure to more adequately reflect the long term performance of a filter. What the new procedure provides is longer initial dosing of KCl particles on the filter prior to the efficiency testing. MERV Designations range from MERV 1 (typically a low efficiency, throwaway filter) up to MERV 20 (a 95%-plus efficiency ULPA filter). The MERV enables one to compare efficiencies of filters at a glance. The higher the MERV rating, the higher the efficiency of the air filter.

In the past furnace filters were made from relatively coarse continuous fibers laid down in a random pattern and built up in layers on a drum and by carding dry staple fibers and forming webs of the carded fibers. Such filters fall short of removing smaller particles and in efficiency performance. Initial efficiency is really not a realistic measure of filter performance because it exaggerates performance for the early part of the actual service life of the filter. This is because when a mechanical air filter is first installed its efficiency is at its lowest point because it has not built up enough lint and particles on the filter to help trap more and smaller lint and particles. Some of these filters had low efficiencies and others had other disadvantages such as low physical integrity and high bulk preventing pleating or making it very difficult.

There are also a host of electret based filters, typically composed of charged polypropylene based fibers, that by MERV indications show good to excellent initial performance. However, these initial readings are misleading. There are two main drawbacks with electret based filter designs. First, the charged nature of the media leads to a rapid drop in efficiency due to the masking of the charges by incoming particles. A minimum is eventually reached whereupon further particle addition leads to a long slow rise in efficiency as the filter fills. The second problem with most electret filters is that they require a metal wire to permanently fold the media. The metal wire, which costs roughly 2 cents/ft$^2$, impacts overall filter system costs. Conventional wisdom is that it is better to use a lower density fiber to construct the filter as more surface area leads to better efficiency performance, but if lower density materials require a metal wire, reconsideration is required.

SUMMARY

Provided is a method of improving filtration efficiency of a fibrous nonwoven filter media. The method comprises providing a filter media and incorporating in the filter media one or more additives selected from the group consisting of silicone additives, wax additives, and mixtures thereof. The filter media comprises glass fibers, polymer fibers, and optionally binder.

Additionally provided is a method of improving filtration efficiency of a fibrous nonwoven filter media. The method comprises forming a carded or spunbond filter media comprising 100 weight % polymer fibers, total fibers basis, and incorporating in the filter media one or more additives selected from the group consisting of silicone additives, wax additives, and mixtures thereof. The filter media can further comprise binder.

Also provided is a fibrous nonwoven filter media comprising 20-60 weight % glass fibers, 15-60 weight % polymer fibers, 1-30 weight % cellulosic fibers, 15-30 weight % binder, and one or more additives selected from the group consisting of silicone additives, wax additives, and mixtures thereof. The filter media meets at least MERV 7 specifications.

Further provided is a fibrous nonwoven filter media comprising 40-60 weight % glass fibers and 40-60 weight % polymer fibers, total fibers basis, optionally binder, and one or more additives selected from the group consisting of silicone additives, wax additives, and mixtures thereof. The filter media meets at least MERV 7 specifications.

It has been surprisingly discovered that inclusion of silicone and/or wax additive(s) in filter media increases filtration efficiency of the media.

DETAILED DESCRIPTION

Inclusion of silicone and/or wax additive(s) in the filter media has surprisingly been found to increase filtration efficiency, for example, by 10-15%. Such additives include, for example, silicone emulsions ET-4327 Emulsion and 84 Additive, both available from Dow Corning, and wax emulsion Michem® 62125 AM, available from Michelman.

The additives are mostly needed on an outermost surface of the filter media. The amount of additives necessary to achieve desired increases in filtration efficiency (e.g., as measured by E3 efficiencies per ANSI/ASHRAE Standard 52.2-2007) depends not only on the fiber make-up of the filter media, but also upon the binder used in forming the filter media. Thus, in embodiments, the additives may be sprayed on the filter media after forming at a level of about 1-15 weight %, for example, about 5 weight %, final filter basis, or incorporated into the chemical binder to achieve similar surface coverage at a level of about 5-25 weight %, for example, about 15 weight % binder solids basis.

The filter media can comprises glass fibers, polymer fibers, cellulosic fibers, binder, and one or more additives selected from the group consisting of silicone additives, wax additives, and mixtures thereof. In particular, the filter media can comprise 20-60 weight % ½" 11 micron glass fibers, 15-60 weight% ½" 4-6 denier crimped polymer fibers, 1-30 weight % cellulosic fibers, 15-30 weight % binder, and one or more additives selected from the group consisting of silicone additives, wax additives, and mixtures thereof. As used herein, weight % is on final filter media basis, unless stated otherwise. The filter media meets at least MERV 7 filtration efficiency (i.e., removal of greater than or equal to 50% to less than 70% of 3.0-10.0 microns particles according to ANSI/ASHRAE Standard 52.2-2007).

The crimped polymer fibers, can be, for example, crimped polyester fibers such as crimped polyethylene terephthalate fibers. In an embodiment, the diameter of the crimped polyester fibers is more than 5 denier. Fine denier crimped fibers are not possible to use in the wet-lay process as they can form entangled structures that will not drain with the whitewater. The polymer fibers can also be any polymer fibers such as polypropylene, nylon, polybutylene terephthalate, polyacrynitrile, polybenzimidizole, and other polymer fibers having similar resilience, toughness and softening point. In an embodiment, the polymer fibers comprise polyethylene terephthalate copolymers or polyolefin core-sheath construction fibers. Use of crimped polymer (e.g., crimped polyethylene terephthalate) fibers improves dust holding characteristics of the filter media by decreasing filter media density. Similarly, bi-component ("bico") structures (e.g., bico polyethylene/polypropylene fibers) can also improve dust holding of a filter as the bico structures permit removal of binder that occupies space within the filter.

Filter media including glass fibers, polymer fibers, and cellulosic fibers facilitate a torturous path of air or gaseous flow through the filter media and results in increased filtration efficiency and also added dirt holding capacity of the filter media. The use of cellulosic fibers, for example, a chemically cross linked bleached Kraft pulp, such as CHBSLM, available from Weyerhaeuser, decreases the air perms and increases the stiffness of the filter media. Also, use of a fully bleached softwood Kraft pulp, such as Kamloops Chinook, also available from Weyerhaeuser, adds bulk and fills the sheet sufficiently to increase filtration efficiency and adds stiffness to the mat and filter media.

The binder composition can be, for example, an acrylic latex, vinyl acrylic, and/or styrene acrylate. The binder composition preferably should be hydrophobic. In an embodiment, an acrylic latex binder has a glass transition temperature, $T_g$, of greater than about 20° C., for example, greater than about 25° C. Suitable acrylic latex materials include Rhoplex™ GL-618, available from Rohm & Haas, and Hycar® 26138, a +25° C. $T_g$ material available from Lubrizol. The acrylic latex can be modified by addition of a melamine crosslinker to enhance cross-linking, which adds stiffness and heat resistance. An exemplary melamine crosslinker is Aerotex® 3030, available from Emerald Carolina Chemical, LLC. It is important to have both the necessary $T_g$ for pleatability and hydrophobicity to create good filters.

In addition to the above-described filters containing crimped polymer fibers, inclusion of silicone and/or wax additive(s) in further media comprising similar components but with non-crimped polymer fibers has similarly been found to increase filtration efficiency. Further, inclusion of silicone and/or wax additive(s) in filter media comprising glass fibers, polymer fibers, and binder (e.g., acrylic binder) has also been found to increase filtration efficiency. In particular, such a filter may comprise 40-60 weight %, for example, 50 weight %, glass fibers (e.g., H ½" glass fibers) and 40-60 weight %, for example, 50 weight %, polymer fibers (e.g., ¼" 1.5 denier polyethylene terephthalate fibers), total fibers basis. The silicone and/or wax additive(s) may be combined with the binder prior to forming the filter. The overall filter may have a basis weight of about 1.0-3.0 lb/csf, for example, 1.2-1.7 lb/csf.

Any suitable means for forming the fibers into a mat can be used. For example, a dilute aqueous slurry of the fibers can be formed and deposited onto an inclined moving screen forming wire to dewater the slurry and form a wet nonwoven fibrous mat in a conventional manner. Any known wet mat machines can be used. After forming, the wet, uncured web is transferred to a second moving screen running through a binder application station where binder is applied to the mat. Binder can be applied to the structure by air or airless spraying, double wire saturating, and curtain coating. Excess binder is removed through vacuum to produce the desired binder level in the mat. The binder entrained mat is then transferred to a moving oven belt which transports the wet mat through a drying and curing oven such a through air dryer. Thus, in summary, the filter media is formed by dispersing the fibers in a fluid dispersion, subjecting the dispersion to a moving forming wire to form a fibrous web, applying the binder to the web, drying the web, and curing/melting the binder around the fibers to form a web.

Alternatively, the nonwoven fibrous mats can be formed by spunbond or carding processes. As is known to one of skill in the art, carding is the process of brushing fibers to prepare them as textiles. In particular, carding can be used to produce a fibrous nonwoven mat of glass and/or polymer fibers.

Application of the binder to the fibers yields a sufficiently stiff mat that pleats well and requires no additional mechanical support to hold the pleats such as metal wire or complex cardboard frames for the resulting filter media. Accordingly, as used herein, the phrase "self supporting" refers to a filter media that requires no additional mechanical support, such as a metal wire or additional cardboard supporting strips, to hold its pleats.

Thus, the filter media can be scored and pleated or folded back upon itself to form a pleated filter media, which will retain its pleats. The pleated filter media is typically formed by passing the filter media through a conventional rotary pleating process where the filter media is scored and pleated or folded back upon itself to selected degrees to form a pleated filter media having pleats of a selected size or sizes and a selected included angle or angles between the pleat portions extending between the scores. The included angles between the portions of the pleats can be uniform or vary and the size of the pleats can be uniform or vary. The pleats can be formed in the filter media by various conventional pleating operations, including but not limited to, rotary pleating, push bar pleating, star gear pleating. The rotary and star gear pleating methods are preferred due to the higher flexural modulus/thickness of the media. If desired for certain pleating operations, the filter media can be reheated prior to the pleating operation to facilitate the scoring of the filter media and the formation of the pleats.

The filtration efficiency of the filter media can be controlled, in part, by varying the basis weight, the fiber diameter, and type of fiber, and the basis weight of the filter media. The binder choice can also affect sheet density by forming "bridges" or "webs" between the fibers at their crossing points, thus reducing porosity of the mat.

In an embodiment, after forming the fibrous air-laid mat, it is transferred to a moving screen running through a binder application station where the binder is applied to the mat. The binder can be applied to the structure by any suitable means including, for example, air or airless spraying, dual wire saturating, and curtain coating application. Excess binder, if present, is removed by vacuum to produce a desired binder level in the filter media. The filter media can then be transferred to a moving oven belt which transports the filter media through a drying and curing oven such as, for example, a through air, air float or air impingement oven.

The aqueous binder composition is curable by the application of heat, i.e., the binder composition is a self cross-linking thermoplastic composition. The filter media can be heated in an oven to effect drying and/or curing of the binder. For example, heated air can be passed through the filter media to remove water and cure the binder. For example, the heat treatment can be around 400° F. or higher, but in an embodiment, the filter media is at or near the hot air temperature for only a few seconds in the downstream end portion of the oven.

It is important not to exceed temperatures that would cause the polymer fibers to shrink. The duration of the heat treatment can be any suitable period of time such as, for example, from about 3 seconds to a minute.

The following illustrative examples are intended to be non-limiting.

EXAMPLES

Several additives analyzed in a flatsheet testing series (at 125 feet/minute) showed significant improvements in filtration efficiency. Filters comprising acrylic binder and melamine formaldehyde resin were rerun under a "binder" stream for a second time; however, instead of binder, a dilute additive stream was added to the filter media during the second run. The filters comprised a 2-4 lb/csf mat constructed of 40 weight % H ½" glass fiber, 40-50 weight % ½" 6 denier crimped polyester fiber, and 10-20% weight % cellulose fibers, total fibers basis. This assembly was then adhered together with a binder. Specific filters comprised:

(1) 32 weight % H ½" Type 117 glass fibers, 40 weight % ⅝" 6 denier crimped polyester fibers, 8 weight % Kamloop Chinook bleached Kraft pulp, 16.6-22.4 weight % Hycar® 26138 acrylic emulsion, and 0.4-0.6 weight % Aerotex® 3030 melamine-formaldehyde resin at 2-4 lb/csf;

(2) 28 weight % H ½" Type 117 glass fibers, 40 weight % ½" 6 denier crimped polyester fibers, 12 weight % Kamloop Chinook bleached Kraft pulp, 18-21 weight % Chembond 246S urea-formaldehyde resin, and 1.7-2.3 weight % Duracet 827 vinyl acrylic emulsion at 2-4 lb/csf; and (3) 1.5 lb/csf fiber blend product containing 50 weight % H ½" glass fibers and 50 weight % ¼" 1.5 denier polyester fibers, total fibers basis, held together with 20 weight % Hycar® 26138 acrylic emulsion, final filter basis.

Among the multitude of additives examined were polyvinylidene fluoride, polyvinylidene dichloride, waxes, silicones, elastomeric latexes, rosin tackifies, and hydrocarbon tactifiers. The additives that performed best were a (camuba) wax emulsion available from Michelman, Michem® 62125 AM, silicone (emulsion) available from Dow Corning, 84 Additive silicone, and an aromatic hydrocarbon available from Dyna-Tech, SureTac 1525. In particular, improvements of E3 efficiencies per ANSI/ASHRAE Standard 52.2-2007 for the these materials are highlighted in Table 1. With regard to SureTac 1525, higher levels of additive were required in order to achieve improvements in filtration efficiency.

TABLE 1

| Additive | Weight % Additive, Final Filter Basis | E3 Efficiency | Improvement in E3 Efficiency |
|---|---|---|---|
| Base Chemistry | — | 47 | — |
| Michem ® 62125 AM | 13 | 69 | +22 |
| 84 Additive | 8 | 74 | +27 |
| SureTac 1525 | 24 | 68 | +21 |

The base chemistry was a 3 lb/csf media comprised of 32 weight % H ½" Type 117 glass fibers, 40 weight % ⅝" 6 denier crimped polyester fibers, 8 weight % Kamloop Chinook bleached Kraft pulp, 16.6-22.4 weight % Hyca® 26138 acrylic emulsion, and 0.4-0.6 weight % Aerotex® 3030 melamine-formaldehyde resin. The base chemistry filter had an air permeability of 540 ft/min/ft2 and a thickness of 115 mil. The additive was applied to the outer surface of the base mat described above. The mats including additive had an air permeability of 450-650 ft$^3$/min/ft$^2$ and a thickness of 90-120 mil.

While initial tests were done under flat sheet testing conditions with an air velocity near 125 feet/minute, later test were done on 24"×24" filters with 30 pleats at a nominal pleat height of 2", tested at 492 feet/min, or 20"×20" filters with 20 pleats at a nominal pleat height of 1", tested at either 295 feet/min for residential filters or 492 feetmin for commercial and industrial filters.

According to ANSI/ASHRAE Standard 52.2-2007, an E3 efficiency of greater than or equal to 35% up to 50% corresponds to MERV 6, an E3 efficiency of greater than or equal to 50% up to 70% corresponds to MERV 7, and an E3 efficiency of greater than or equal to 70% corresponds to MERV 8.

Additional efficiency testing was done with the Michem® 62125 AM (containing 25 weight % solids), 84 Additive (containing 50 weight % solids), and SureTac 1525 (containing 60 weight % solids). In particular, the additives were included in a melamine modified acrylic binder (at weight % in the binder of both 2.5 and 5 weight % binder solids basis) and a polyvinyl acetate modified urea-formaldehyde resin (at weight % in the binder of 5 weight % binder solids basis).

Table 2 provides testing data for filters composed on 30 pleats at a nominal pleat height of 2". The binder used was a melamine modified acrylic binder and was present in an amount of 20 weight %, final filter basis. The additive, if present, was incorporated into the binder prior to forming the filter. The 2.5-3 lb/csf filter media were comprised of 40 weight % 2.75 H ½" glass fibers, 50 weight % ½" 6 denier crimped polyethylene terephthalate fibers, and 10% cellulosic fibers, total fibers basis.

TABLE 2

| Additive (Binder Solids Basis) | E3 | MERV | Pressure Drop (inch H$_2$O) |
|---|---|---|---|
| None | 56 | 7 | 0.2 |
| 84 Additive (2.5 weight %) | 61 | 7 | 0.21 |
| 84 Additive (5 weight %) | 53 | 7 | 0.2 |
| Michem ® 62125 AM (2.5 weight %) | 54 | 7 | 0.21 |
| Michem ® 62125 AM (5 weight %) | 53 | 7 | 0.23 |
| SureTac 1525 (2.5 weight %) | 51 | 7 | 0.23 |
| SureTac 1525 (5 weight %) | 48 | 6 | 0.2 |

Table 3 provides additional testing data for filters composed on nominal 24"×24" filters with 30 pleats at a nominal pleat height of 2". These tests were run at a testing velocity of 492 feet/min. Again, the binder used was a melamine modified acrylic binder and was present in an amount of 20 weight %, final filter basis, the final filter having a basis weight near 2.5 lb/csf (prior to application of the additive), and the filters were comprised of 40 weight % 2.75 H ½" glass fibers, 50 weight % ½" 6 denier crimped polyethylene terephthalate fibers, and 10% cellulosic fibers, total fibers basis. The additive was applied onto the filter after forming the filter.

TABLE 3

| Additive (Final Filter Basis) | E3 | MERV | Pressure Drop (inch H$_2$O) |
|---|---|---|---|
| 84 Additive (5 weight %) | 76 | 8 | 0.21 |
| Michem ® 62125 AM (5 weight %) | 51 | 7 | 0.21 |
| SureTac 1525 (5 weight %) | 50 | 7 | 0.21 |

Table 4 provides testing data for 24"×24" filters composed on 30 pleats at a nominal pleat height of 2". The binder used was a polyvinyl acetate modified urea-formaldehyde resin and was present in an amount of 20 weight %, final filter basis. The additive, if present, was incorporated into the binder prior to forming the filter, and was present in an amount of 5 weight %, binder solids basis. Glass fibers comprised 40 weight %, total fibers basis. The polymer fibers were ½" 6 denier crimped polyethylene terephthalate fibers.

TABLE 4

| Glass Fiber | Weight % Polymer Fibers (Total Fibers Basis) | Weight % Cellulosic Fibers (Total Fibers Basis) | Additive | E3 | MERV | Pressure Drop (inch H$_2$O) |
|---|---|---|---|---|---|---|
| 2.5 H ½" | 40 | 20 | None | 59 | 7 | 0.23 |
| 2.5 H ½" | 50 | 10 | None | 50 | 7 | 0.25 |
| 2.5 H ½" | 50 | 10 | 84 Additive | 75 | 8 | 0.21 |
| 2.25 H ½" | 45 | 15 | None | 49 | 6 | 0.19 |

Table 4 shows that with polyvinyl acetate modified urea-formaldehyde resin binder, addition of 84 Additive in an amount of 5 weight %, binder solids basis, provides improvements in filtration efficiency.

Table 5 provides testing data for 20"×20" filters composed on 18 pleats at a nominal pleat height of 1". This represents a residential filter that gets tested at 295 feet/min. The binder used was an acrylic. The fibers of the filter media were comprised of 50 weight % H ½" glass fibers and 50 weight % ¼" 1.5 denier polyethylene terephthalate fibers. The additive, if present, was incorporated into the binder prior to forming the filter.

TABLE 5

| Additive (binder solids basis) | Filter Weight (lb/100 ft$^2$) | E3 | MERV | Pressure Drop (inch H$_2$O) |
|---|---|---|---|---|
| None | 1.24 | 46 | 6 | 0.19 |
| None | 1.28 | 43 | 6 | 0.19 |
| None | 1.29 | 39 | 6 | 0.19 |
| 84 Additive (5% weight %) | 1.26 | 44 | 6 | 0.18 |
| 84 Additive (10 weight %) | 1.23 | 46 | 6 | 0.18 |
| 84 Additive (15 weight %) | 1.05 | 43 | 6 | 0.16 |
| 84 Additive (15 weight %) | 1.22 | 42 | 6 | 0.17 |
| 84 Additive (15 weight %) | 1.23 | 59 | 7 | 0.18 |
| 84 Additive (15 weight %) | 1.38 | 60 | 7 | 0.19 |

Table 6 provides testing data for 20"×20" filters composed on 25 pleats at a nominal pleat height of 1". The additive, if present, was applied to a formed filter media, and was present in an amount of 2 weight %, final filter basis. Glass fibers comprised 50 weight %, total fibers basis. Polymer fibers were bico PE/PP (polyethylene/polypropylene) fibers, and comprised 50 weight %, total fibers basis.

TABLE 6

| Glass Fiber | Additive | E3 | MERV | Pressure Drop (inch H$_2$O) |
|---|---|---|---|---|
| 1.25 H ½" | None | 57 | 7 | 0.21 |
| 1.25 H ½" | 84 Additive | 85 | 10 | 0.19 |
| 1.5 H ½" | None | 68 | 7 | 0.23 |
| 1.5 H ½" | 84 Additive | 72 | 8 | 0.18 |

Table 6 shows that addition of 84 Additive provides improvements in filtration efficiency for wet-laid media comprised of glass and polymer fibers and lacking binder.

Similarly, when additive (i.e., 84 Additive) was included in self supporting spunbond filter media comprised of 2.5-3 lb/csf copolyester fibers, efficiency enhancements of about 10% were observed (i.e., E3 value increased from 57 to 67). Such filter media comprised of 100 weight % polymer fibers, total fibers basis, can further comprise binder. Additive(s) may be present in such filter media comprised of 100 weight % polymer fibers, total fibers basis, in an amount of about 1-20 weight %, final filter basis. Thus, addition of silicone and/or wax additive(s) to improve filtration efficiency can be effective on 1.5-3 lb/csf carded or spunbond filter media containing polyester fibers contained within a binder and/or copolyester fibers contained within the additive and/or binder containing the additive.

While various embodiments have been described, it is to be understood that variations and modifications may be resorted to as will be apparent to those skilled in the art. Such variations and modifications are to be considered within the purview and scope of the claims appended hereto.

What is claimed is:

1. A method of improving filtration efficiency of a fibrous nonwoven filter media, the method comprising:
   providing a filter media comprising:
      40-60 weight % glass fibers, total fibers basis; and
      40-60 weight % polymer fibers, total fibers basis; and
      incorporating in the filter media one or more additives selected from the group consisting of silicone additives, wax additives, and mixtures thereof.

2. The method of claim 1, wherein incorporating in the filter media the one or more additives comprises applying the one or more additives to the filter media.

3. The method of claim 2, wherein the one or more additives are present in an amount of about 1-15 weight %, final filter basis.

4. The method of claim 1, wherein the filter media is self supporting.

5. The method of claim 1, wherein the filter media meets at least MERV 7 specifications.

6. The method of claim 1, wherein the filter media further comprises binder.

7. The method of claim 6, wherein:
   incorporating in the filter media the one or more additives comprises applying the one or more additives to the filter media; and
   the one or more additives are present in an amount of about 5 weight %, final filter basis.

8. The method of claim 6, wherein incorporating in the filter media the one or more additives comprises including the one or more additives in the binder.

9. The method of claim 8, wherein the one or more additives are present in an amount of about 5-25 weight %, binder solids basis.

10. The method of claim 8, wherein the one or more additives are present in an amount of about 15 weight %, binder solids basis.

11. The method of claim 6, wherein the filter media further comprises:
cellulosic fibers.

12. The method of claim 1, wherein the polymer fibers comprise crimped polymer fibers.

13. The method of claim 1, wherein:
the one or more additives are present in an amount of about 2 weight %, final filter basis.

14. The method of claim 1, wherein the polymer fibers comprise bi-component polyethylene/polypropylene fibers.

15. The filter media of claim 1, wherein the polymer fibers comprise crimped polyester fibers.

16. The filter media of claim 15, wherein the polymer fibers comprise crimped polyethylene terephthalate fibers.

17. The filter media of claim 6, wherein the binder comprises a modified urea-formaldehyde binder or an acrylic latex binder.

18. The filter media of claim 6, wherein the binder comprises an acrylic latex having a glass transition temperature of greater that about 20° C.

19. The filter media of claim 1, wherein the filter media comprises:
40-60 weight % H ½" glass fibers, total fibers basis; and
40-60 weight % ¼" 1.5 denier polyethylene terephthalate fibers, total fibers basis; and
wherein the filter media further comprises acrylic binder.

20. The filter media of claim 1, wherein the filter media comprises:
40-60 weight % glass fibers;
40-60 weight % bi-component polyethylene/polypropylene fibers.

* * * * *